United States Patent [19]

Velasquez et al.

[11] Patent Number: 5,670,273
[45] Date of Patent: Sep. 23, 1997

[54] METHOD OF PREPARING ELECTROCHEMICAL CELLS

[75] Inventors: David A. Velasquez, Fairfirld, Calif.; Douglas B. Holmes, Lexington; E. Lawrence Goglin, Sudbury, both of Mass.

[73] Assignee: Valence Technology, Inc., Henderson, Nev.

[21] Appl. No.: 603,894

[22] Filed: Feb. 22, 1996

[51] Int. Cl.$^6$ .................................................. H01M 6/12
[52] U.S. Cl. ............................................ 429/162; 29/623.1
[58] Field of Search .................................. 429/162, 152; 29/623.3, 623.4, 623.1

[56] References Cited

U.S. PATENT DOCUMENTS

| | | |
|---|---|---|
| 4,254,191 | 3/1981 | Kniazzeh .................................. 429/162 |
| 5,077,150 | 12/1991 | Yoneda ..................................... 429/162 |
| 5,456,000 | 10/1995 | Gozdz et al. ............................. 29/623.2 |
| 5,460,904 | 10/1995 | Gozdz et al. ............................. 429/192 |

*Primary Examiner*—Prince Willis, Jr.
*Assistant Examiner*—Jonathan S. Krueger
*Attorney, Agent, or Firm*—Robert Krebs

[57] ABSTRACT

A method of fabricating electrochemical cells and batteries wherein the successive anode and cathode layers are separated by a polymeric electrolyte layer having a protruding polymer edge around its perimeter which reduces the likelihood of inadvertent contact between the anode and cathode current collectors is provided. The polymer edge functions as a non-conducting physical barrier positioned between adjacent current collectors.

20 Claims, 1 Drawing Sheet

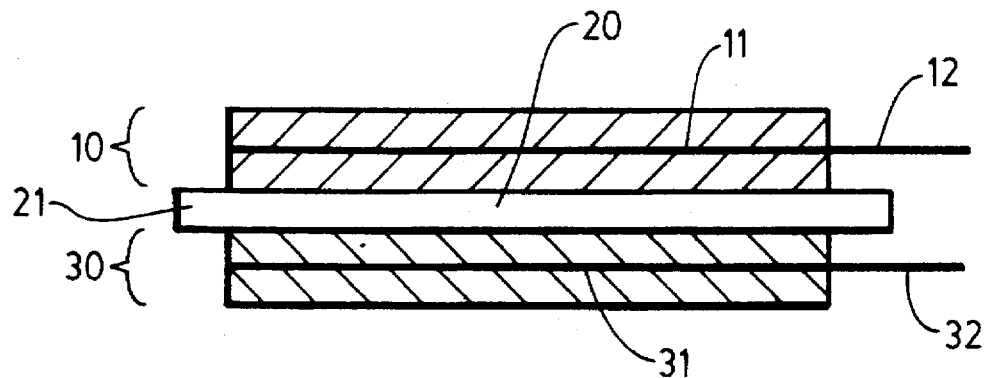
FIG._1.
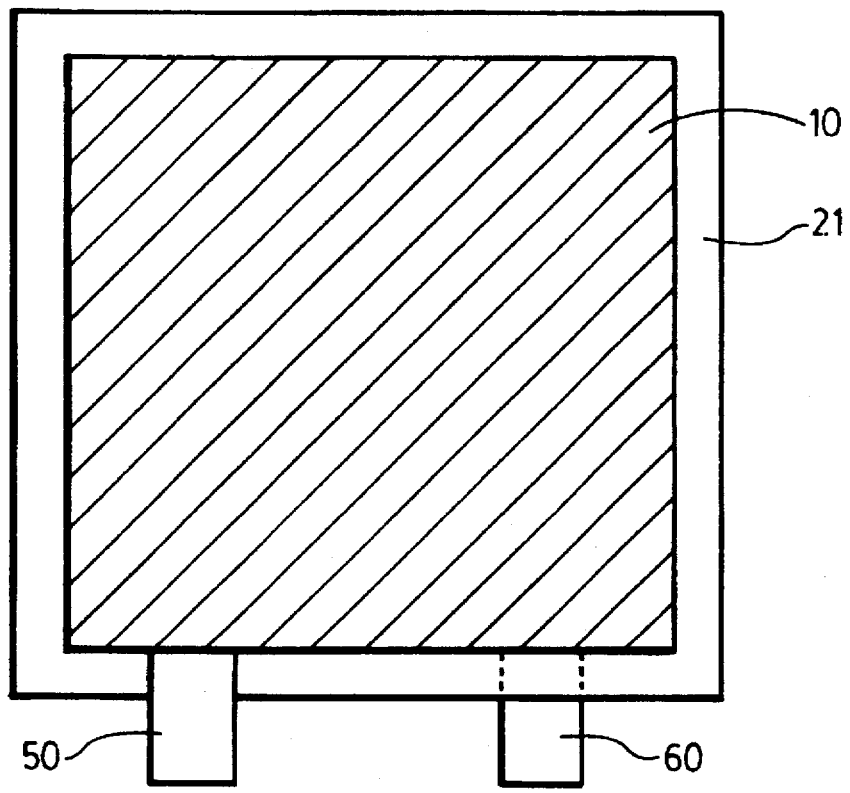
FIG._2.

METHOD OF PREPARING ELECTROCHEMICAL CELLS

FIELD OF THE INVENTION

The present invention relates to electrochemical devices and, more particularly, to a method of fabricating solid, non-aqueous electrochemical cells demonstrating improved performance.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595 and 5,028,500.

Despite these advantages, present methods of fabricating electrochemical cells produce cells and batteries that are prone to short circuits. This occurs, for instance, when a current collector develops burrs or rough edges during fabrication. These burrs can come into contact with another current collector. Simply reducing the size of the current collectors is not a desirable option of avoiding short circuits as this also reduces the electrical contact area between the current collector and electrode material. In addition, this technique may be difficult to implement with present methods of fabricating electrochemical cells. For instance, where electrochemical cells (or precursors thereof) are mass produced (e.g., cut to size) from a web comprising a tri-layer laminate having (1) an anode layer, (2) an electrolyte (or separator) layer, and (3) a cathode layer, it would be difficult to reduce the size of the current collectors within the anode and cathode in this process.

Short circuits are also caused by misplacement or misalignment during assembly. For example, in the placement of each component piece upon the underlying pieces, prior to lamination or welding, any misplacement, or skewing of the topmost piece can, later, result in shorting if a small portion of the edge of one electrode becomes positioned such that it can touch a portion of the opposite electrode, especially due to pressure, flexure or movement caused by thermal expansion or contraction.

SUMMARY OF THE INVENTION

The present invention is based in part on a process of fabricating electrochemical cells and batteries wherein the successive anode and cathode layers are separated by a polymeric electrolyte layer having a protruding polymer edge or strip around its perimeter which reduces the likelihood of inadvertent contact between adjacent anode and cathode current collectors. The polymer edge functions as a non-conducting physical barrier.

In one aspect, the invention is directed to a method of preparing an electrochemical cell comprising the steps of:

(a) forming an anode film onto at least one surface of an anode current collector to form an anode;

(b) forming a cathode film onto at least one surface of a cathode current collector to form a cathode; and (c) interposing a polymeric layer containing an electrolyte solution between the anode and cathode wherein the polymeric layer has a surface area that is larger than that of the anode film and cathode film, wherein the perimeter of the polymeric electrolyte layer forms an exposed strip that serves as a barrier to direct contact between the anode current collector and cathode current collector.

In another aspect, the invention is directed to a method of preparing an electrochemical cell comprising the steps of:

(a) preparing a polymeric layer comprising a first plasticizer;

(b) covering at least one surface of an anode current collector with a layer of anode material comprising a first polymer, an intercalation carbon material, and a second plasticizer to form an anode precursor wherein each layer of said anode material has a surface area that is smaller than that of the polymeric layer;

(c) covering at least one surface of a cathode current collector with a layer of cathode material comprising a second polymer, a cathode active material, and a third plasticizer to form a cathode precursor wherein each layer of said cathode material has a surface area that is smaller than that of the polymeric layer;

(d) interposing the polymeric layer between the anode precursor and the cathode precursor so that the perimeter of the polymeric layer forms an exposed strip that serves as a barrier to direct contact between the anode current collector and cathode current collector;

(e) removing said first, second, and third plasticizer; and (f) placing an electrolyte solution comprising an electrolyte solvent and an inorganic salt into said anode precursor, cathode precursor, and polymeric layer.

In a further aspect, the invention is directed to an electrochemical cell comprising:

an anode having an anode current collector with an anode film on at least one side of the anode current collector;

a cathode having a cathode current collector with a cathode film on at least one side of the cathode current collector; and a polymeric layer containing an electrolyte solution comprising an electrolyte solvent and a salt that is interposed between the anode and cathode, wherein the polymeric layer has a surface area that is larger than that of the anode film and cathode film, wherein the perimeter of the polymeric layer forms an exposed strip that serves as a barrier to direct contact between the anode current collector and cathode current collector

BRIEF DESCRIPTION OF THE DRAWINGS

FIG. 1 is a schematic, cross-sectional view of an electrochemical cell.

FIG. 2 is a schematic, top view of an electrochemical cell.

DETAILED DESCRIPTION OF THE PREFERRED EMBODIMENTS OF THE INVENTION

The present invention is directed to a method of preparing electrochemical cells. Preferred cells include: a cathode comprising an active material, an intercalation based carbon anode, with each electrode capable of reversibly incorporating (e.g., intercalating) an alkali metal ion, and a polymeric matrix containing an electrolyte solution comprising an organic electrolyte solvent and a salt of the alkali metal. Each electrode has a current collector. Particularly preferred electrochemical cells and batteries use lithium and salts thereof.

The anode of the present invention generally comprises an anode film that is laminated onto one or both sides of the current collector which is a thin metal foil or grid. Typically, each anode film is from about 100 μm to about 250 μm in thickness, preferably about 110 μm to about 200 μm, and more preferably about 125 μm to about 175 μm.

Similarly, the cathode of the present invention generally comprises a cathode film that is laminated onto one or both sides of the cathode current collector which is a thin metal foil or grid. Typically, each cathode film is from about 100 μm to about 200 μm in thickness, preferably about 130 μm to about 175 μm, and more preferably about 140 μm to about 165 μm.

The anode and cathode each also includes a current collector that comprises, for example, a screen, grid, expanded metal, woven or non-woven or knitted wire fabric formed from an electron conductive material such as metals or alloys. Preferably, the current collector has a thickness from about 100 μm to about 250 μm, preferably about 110 μm to about 200 μm, and more preferably about 125 μm to about 175 μm. Each current collector is also connected to a current collector tab which extends from the edge of the current collector. In batteries comprising multiple electrochemical cells, the anode tabs are preferably welded together and connected to a lead. The cathode tabs are similarly welded and connected to a lead. External loads can be electrically connected to the leads. Current collectors and tabs are described in U.S. Pat. No. 4,925,752, 5,011,501, and 5,326,653, which are incorporated herein.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability liquid solvents (e.g., diethyl ether) or by dense gases for example. Preferred plasticizers include, for example, dibutyl phthalate, dioctylphthalate, and acetates, glymes, and low molecular weight polymers.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solvent. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and polymeric layer comprising an electrolyte solution interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. The solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et at., Proc. Int. Power Sources Symp., 34th, pp. 81–83 (1990) and by Abraham et at., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as a polymeric layer in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidenedifluroide and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, NaSCN, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$, and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,β-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ,-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene aliamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) are described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq 2$. Blends can also include $Li_y$-$\alpha$-$MnO_2$ ($0 \leq y<1$) which is $Li_yNH_4Mn_8O_{16}$ ($0 \leq y<1$) which has a hollandite-type structure. Blends comprising $Li_y$-$\alpha$-$MnO_2$ where $0 \leq y<0.5$ are preferred $\alpha MnO_2$ can be synthesized by precipitation from a reaction between a $MnSO_4$ solution and $(NH_4)_2S_2O_8$ as an oxidizing agent.

Lithiation (also referred to as "prelithiation") of $\alpha MnO_2$ can be accomplished via a solid state reaction:

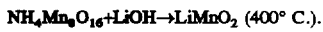

$NH_4Mn_8O_{16}+LiOH \rightarrow LiMnO_2$ (400° C.).

Li-$\alpha$-$MnO_2$ retains the same structure as Hollandite. See, Botkovitz et. al., J. of Power Sources, 43–44 (1993) 657–665, which is incorporated herein, for a discussion of the structure and electrochemical characteristics of Li-$\alpha$-$MnO_2$. $Li_y$-$\alpha$-$MnO_2 0 \leq y<0.5$ is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

Methodology

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive method can be adapted to form anode, cathode, and/or polymeric matrix structures in prior art electrochemical cells. The following illustrates a method of how an electrolytic cell could be fabricated with the inventive process. Examples 1 and 2 describe the process of preparing the anode slurry and cathode slurry, respectively. Example 3 describes the procedures for fabricating a solid electrolyte cell.

The invention will be described using the anode and cathode structures wherein electrode materials (or films) are laminated onto both sides of the current collectors, however, it is understood that the invention is applicable to other configurations, for example, where one side of the anode and/or cathode current collector is laminated.

EXAMPLE 1

The anode current collector employed was a sheet of expanded copper metal that is about 50 μm thick. It is available under the designation 2Cu5-125 (flatten) from Delker, in Branford, Conn.

The anode slurry was prepared as follows:

A polymer mixture comprising a copolymer of vinylidenedifluoride (VDF) and hexafluoropropylene (HFP) was prepared by mixing 6.8 grams of the copolymer in 20 grams of acetone. The copolymer (ave. MW 125K) was Kynar Flex 2801# from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite into 0.9 grams of carbon black into a solution containing 60 grams acetone, 10.5 grams dibutyl phthalate, and 0.5 grams of a suffactant. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carb Willebroek, Belgium. Preferred surfactants include Pluronic FC68™ from BASF, Mt. Olive, N.J. and Flurad 430™ from 3M Co. St. Paul, Minn. The surfactant disperses the graphite. The graphite mixture was then vigorously mixed in a high shear mixer until a substantially homogeneous blend was formed. A suitable mixer is available from Ross Model ME100DLX, Hauppauge, New York, operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 μm thick. The aluminum grid is available under the designation 2AL5-077 from Delker, in Branford, Conn.

The cathode slurry was prepared as follows:

A polymer mixture comprising a copolymer of vinylidenedifluoride (VDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by first adding 28.9 grams of a cathode-active material blend comprising $Li_xMnO_4$ (spinel) ($0 \leq x < 2$) and $Li_y$-$\alpha$-$MnO_2$ ($0 \leq y < 1$) (1:1 weight ratio), 2.4 grams of carbon black (Super P™) into a solution containing 60 grams acetone, 8.7 grams dibutyl phthalate, and 0.5 grams of a surfactant. The mixture was then vigorously mixed in the a high shear mixer until a substantially homogeneous blend was formed.

The cathode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell precursor is prepared by positioning a polymeric matrix between the anode and cathode and thereafter fusing the structures under moderate pressure and temperature (e.g., 130° C.). The pressure and temperature employed will depend on the polymer(s) forming the matrix. The polymeric matrix is formed by casting a slurry comprising acetone, dibutyl phthalate, silanized fumed $SiO_2$, and a VDF/HFP copolymer onto a carrier web or other substrate and allowing the acetone to evaporate. No curing by radiation is required. The $SiO_2$ is a filler which imparts toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the slurry is mixed under low shear conditions as not to degrade the copolymer. The anode, cathode, and separator films can be prepared separately or each can be fabricated in the form of a long web and stored as individual rolls. Each web can be cut to size as needed.

As shown in FIG. 1, the precursor comprises an anode 10, a polymeric layer 20, and a cathode 30. The anode current collector 11 has a tab 12 protruding therefrom and the cathode collector 31 has a tab 32 protruding therefrom. The polymeric layer 20 has a surface area that is larger than that of the anode film and cathode film wherein the perimeter of the polymeric electrolyte layer forms an exposed strip that serves as a barrier to direct contact between the anode current collector and cathode current collector. Strip 21 preferably extends about 1–2.5 mm from the edge of the precursor. Furthermore, preferably except for strip 21 and tabs 12 and 32, the side surface of the electrochemical cell precursor is continuous or flush. Each current collector tab is integral to the current collector. By integral is meant that the body of the current collector and tab form a unit, that is, they are not separate members that are attached (e.g., welded) together.

The anode components, namely the anode current collector and the anode films that are laminated on the top and lower surface of the current collector, preferably should have the same surface dimensions (e.g., same width and length). Similarly, the cathode components, namely the cathode current collector and the cathode films that are laminated on the top and lower surface of the current collector, preferably should have the same surface dimensions. The edge or perimeter of the current collectors are flush (i.e., aligned with) the edge of the electrode (anode and cathode) film. Although the surface geometry is not critical, it is also preferred that the anode and cathode surfaces have a regular configuration such as a rectangle or circle.

In fabricating a battery, a plurality of electrochemical precursors can be stacked one on top of each other so that the anode tabs line up on one side and the cathode tabs line up on the other. As shown in FIG. 2, the anode tabs 50 are welded together and thereafter collectively electrically connected to a first nickel lead (not shown). Similarly, the cathode tabs 60 are welded together and thereafter collectively electrically connected to a second nickel lead (not shown). The leads are employed to connect to an external load. (Aluminum leads may also be used.)

Next the dibutyl phthalate is extracted from the precursor or plurality of electrochemical cell precursors in the case of a battery. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide.

Following extraction, the precursor is then packaged in moisture-impermeable material which is described, for example, in U.S. Pat. No. 5,326,653 which is incorporated herein. The precursor is then activated. Extraction and activation are preferably done in an inert (e.g., argon) atmosphere. Finally, the packaging is sealed. Alternatively, the precursor (or plurality of electrochemical cell precursors) is pre-packaged in the moistureimpermeable material prior to extraction and activation.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of preparing an electrochemical cell comprising the steps of:
   (a) forming an anode film onto at least one surface of an anode current collector to form an anode;
   (b) forming a cathode film onto at least one surface of a cathode current collector to form a cathode; and
   (c) interposing a polymeric layer containing an electrolyte solution between the anode and cathode wherein the polymeric electrolyte layer has a surface area that is larger than that of the anode film and cathode film wherein the perimeter of the polymeric electrolyte layer forms an exposed strip that serves as a barrier to direct contact between the anode current collector and cathode current collector provided that either (i) in forming the anode an anode film is formed on both surfaces of the anode current collector, or (ii) in forming the cathode a cathode film is formed on both surfaces of the cathode current collector, or (iii) in forming the anode, an anode film is formed on both surfaces of the anode current collector and in forming the cathode a cathode film is formed on both surfaces of the cathode current collector.

2. The method of claim 1 wherein said anode current collector has an anode film on each side and said cathode current collector has a cathode film on each side.

3. The method of claim 1 wherein said anode current collector has a perimeter that is substantially flush with the perimeter of the anode film and the cathode current collector has a perimeter that is substantially flush with the perimeter of the cathode film.

4. The method of claim 3 wherein said anode comprises an anode tab which is integral with said anode current collector and wherein said cathode comprises a cathode tab which is integral with said cathode current collector.

5. A method of preparing an electrochemical cell comprising the steps of:
   (a) preparing a polymeric layer comprising a first plasticizer;
   (b) covering at least one surface of an anode current collector with a layer of anode material comprising a first polymer, an intercalation carbon material, and a second plasticizer to form an anode precursor wherein each layer of said anode material has a surface area that is smaller than that of the polymeric layer;
   (c) covering at least one surface of a cathode current collector with a layer of cathode material comprising a second polymer, a cathode active material, and a third plasticizer to form a cathode precursor wherein each layer of said cathode material has a surface area that is smaller than that of the polymeric layer;
   (d) interposing the polymeric layer between the anode precursor and the cathode precursor so that the perimeter of the polymeric layer forms an exposed strip that serves as a barrier to direct contact between the anode current collector and cathode current collector;
   (e) removing said first, second, and third plasticizers; and
   (f) placing an electrolyte solution comprising an electrolyte solvent and an inorganic salt into said anode precursor, cathode precursor, and polymeric layer provided that either (i) in forming the anode precursor a layer of anode material covers both surfaces of the anode current collector or ii in forming the cathode precursor a layer of cathode material covers both surfaces of the cathode current collector, or (iii) in forming the anode precursor a layer of anode material covers both surfaces of the anode current collector and in forming the cathode precursor a layer of cathode material covers both surfaces of the cathode current collector.

6. The method of claim 5 wherein the anode material, cathode material, and polymeric layer each further comprises an inert liquid solvent and said method further comprises the step of removing said inert liquid solvents before step (f).

7. The method of claim 5 wherein the first, second, and third plasticizers comprise dibutyl phthalate.

8. The method of claim 6 wherein the inert liquid solvent comprises acetone.

9. The method of claim 5 wherein said anode current collector has an anode film on each side and said cathode current collector has a cathode film on each side.

10. The method of claim 5 wherein said anode current collector has a perimeter that is substantially flush with the perimeter of the anode film and the cathode current collector has a perimeter that is substantially flushed with the perimeter of the cathode film.

11. The method of claim 10 wherein said anode comprises an anode tab which is integral with said anode current collector and wherein said cathode comprises a cathode tab which is integral with said cathode current collector.

12. An electrochemical cell comprising:

an anode layer having an anode current collector with an anode film on at least one side of the anode current collector;

a cathode layer having a cathode current collector with a cathode film on at least one side of the cathode current collector; and a polymeric layer containing an electrolyte solution comprising an electrolyte solvent and a salt that is interposed between the anode and cathode, wherein the polymeric layer has a surface area that is larger than that of the anode film and cathode film, wherein the perimeter of polymeric electrolyte layer forms an exposed strip that serves as a barrier to direct contact between the anode current collector and cathode current collector provided that either (i) both sides of the anode current collector are coated with an anode film, or (ii) both side of the cathode current collector are coated with a cathode film, or (iii) both sides of the anode current collector are coated with an anode film and both side of the cathode current collector are coated with a cathode film.

13. The electrochemical cell of claim 12 wherein said anode current collector has an anode film on each side and said cathode current collector has a cathode film on each side.

14. The electrochemical cell of claim 12 wherein said anode current collector has a perimeter that is substantially flush with the perimeter of the anode film and the cathode current collector has a perimeter that is substantially flush with the perimeter of the cathode film.

15. The electrochemical cell of claim 14 wherein said anode comprises an anode tab which is integral with said anode current collector and wherein said cathode comprises a cathode tab which is integral with said cathode current collector.

16. The electrochemical cell of claim 12, wherein the anode current collector comprises copper.

17. The electrochemical cell of claim 12, wherein the cathode current collector comprises aluminum.

18. The electrochemical cell of claim 12, wherein the anode film comprises carbon materials selected from the group consisting of graphite, cokes, and mesocarbons.

19. The electrochemical cell of claim 12, wherein the cathode film comprises cathodic material selected from the group consisting of lithiated cobalt oxides, lithiated manganese oxides, lithiated nickel oxides, and mixtures thereof.

20. The electrochemical cell of claim 18, wherein the cathode film comprises cathodic material selected from the group consisting of lithiated cobalt oxides, lithiated manganese oxides, lithiated nickel oxides, and mixtures thereof.

* * * * *